Patented Apr. 10, 1934

1,954,624

UNITED STATES PATENT OFFICE 1,954,624

BALANCING AND TESTING TELEGRAPH CIRCUITS

John H. Hackenberg, Jackson Heights, N. Y., assignor to The Western Union Telegraph Company, New York, N. Y., a corporation of New York Application September 14, 1932, Serial No. 633,210

6 Claims. (Cl. 178—69)

This invention relates to a method of balancing the main and artificial lines of telegraph systems and for making tests pertaining to the characteristics of telegraph circuits.

The object of my invention is to provide an efficient method of balancing duplex circuits which is more accurate and can be made with less apparatus than prior methods; and to provide means for making various tests without any laborious calculations or additional apparatus.

Figure 1:
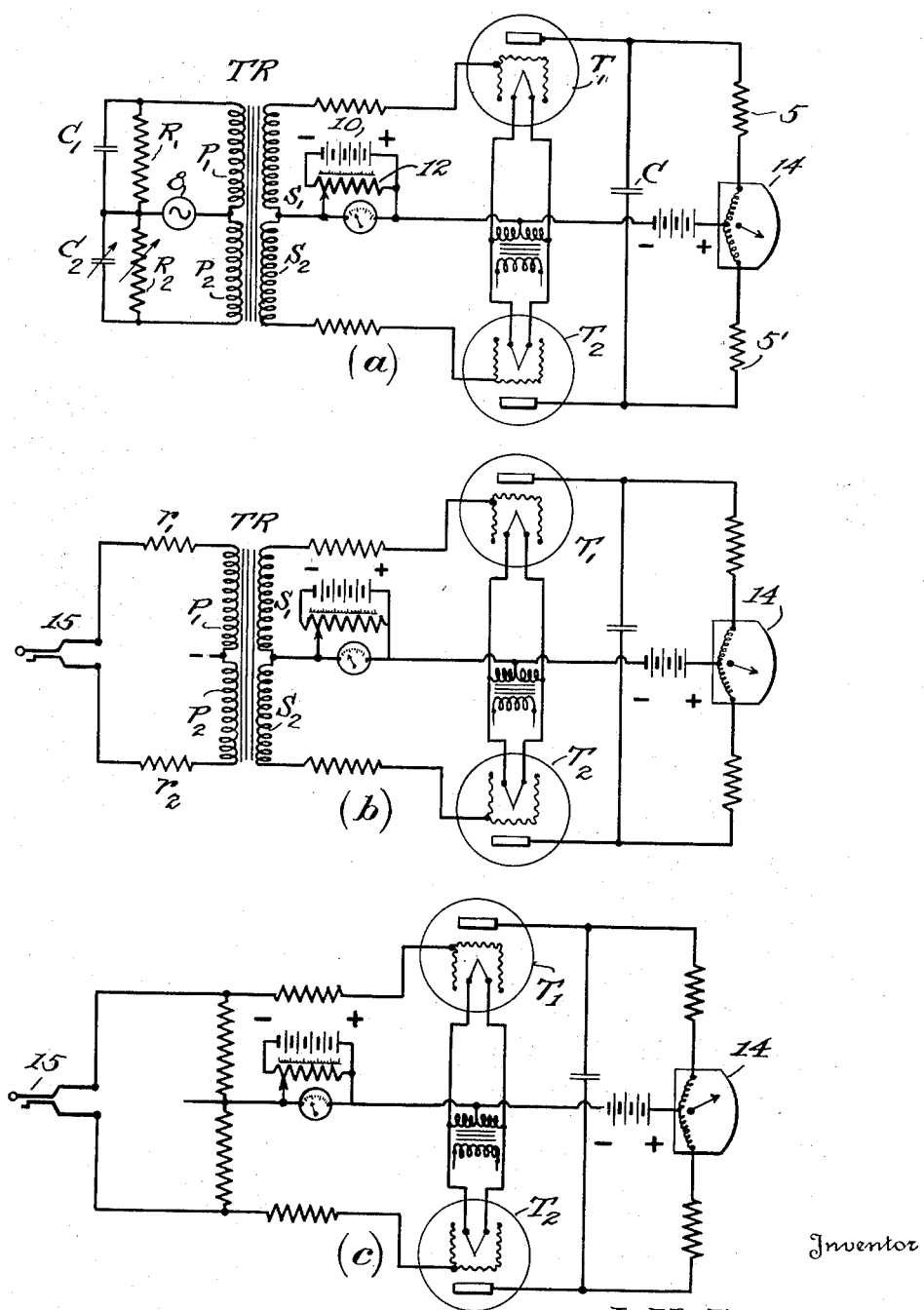
Figure 2:
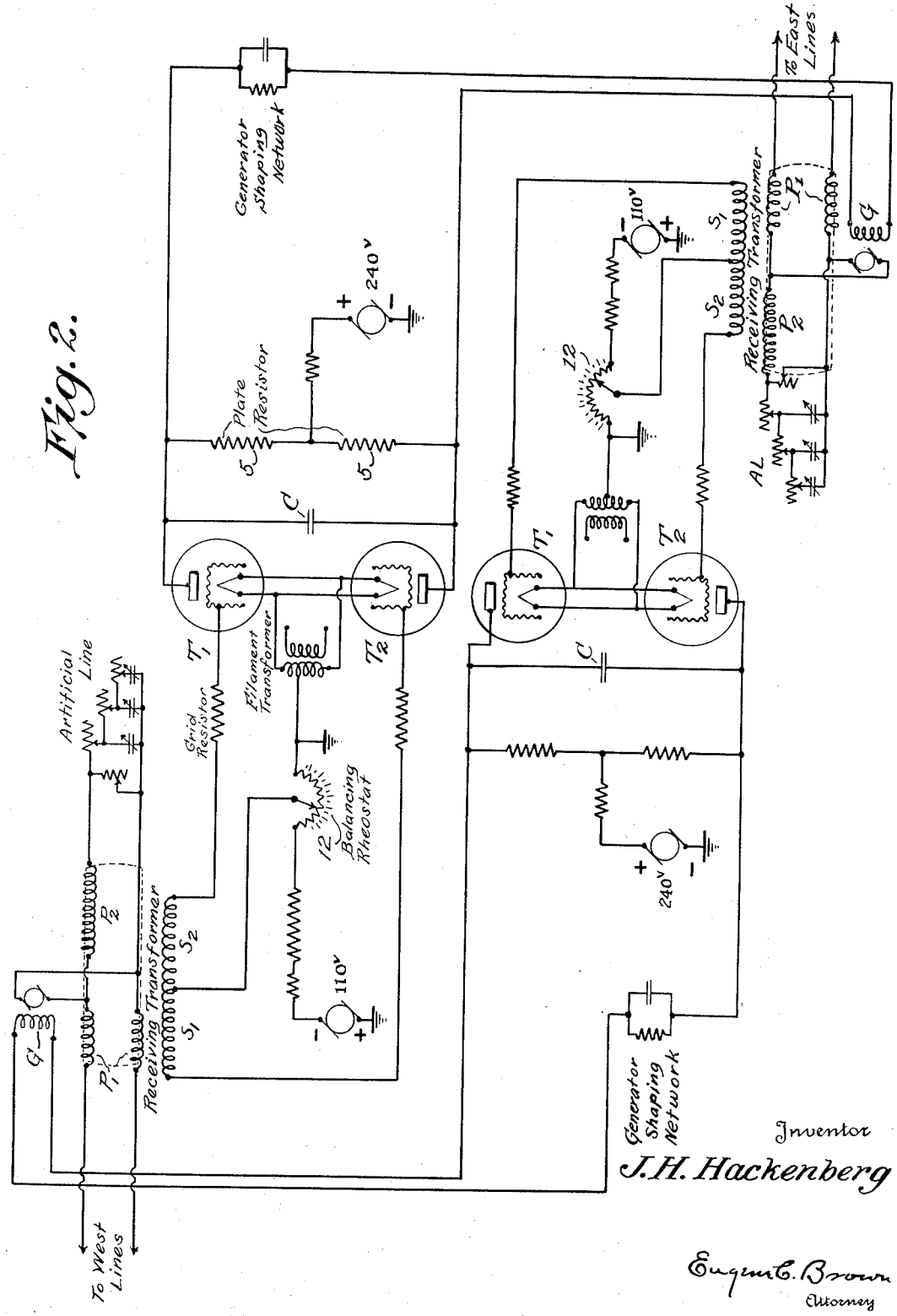

In the following detailed description I shall refer to the accompanying drawings in which Figure 1 shows a series of diagrams to illustrate the principles involved; and Figure 2 is a schematic diagram illustrating the application of my invention to a duplex repeater for superposed telegraph circuits.

In the practical application of my method of balancing telegraph circuits I utilize the characteristics of gaseous arc discharge tubes of a well known type in which the grid completely surrounds the cathode and merely functions to initiate a discharge between the plate and cathode, with no further control over the arc after starting. The discharge across the gaseous path is instantaneous upon the application of the critical voltage to the grid and the current rises abruptly to the full value. A pair of these tubes are connected in an inverter circuit arrangement as described in the proceedings of the National Academy of Sciences, March 1929, vol. 15, No. 3, page 218. In this arrangement the tubes are mutually quenching. In other words, one of the tubes being in operation, it is instantly extinguished or quenched by the actions set up upon the starting of the other tube. The output of the gaseous conduction tubes is applied to the field winding of a generator through a filter or shaping network which serves to shape the current waves. The armature of the generator is connected to the outgoing line and functions as the transmitter of the telegraph signals in response to the reversals in the field winding.

For the purpose of explaining the principles involved I shall first refer to the diagram Figure 1a wherein are shown a pair of electrostatically controlled arc discharge tubes $T_1$ and $T_2$ connected in inverter arrangement by means of the condenser C and resistances 5 and 5' in the plate circuits. Both primary and secondary windings of the input transformer TR are center tapped.

In the circuit of the primary coil $P_1$ is connected the network consisting of the condenser $C_1$ and the resistance $R_1$. In circuit with the primary coil $P_2$ is the network comprising the condenser $C_2$ and the resistance $R_2$. A source of alternating potential 8 is inserted between the center tap of the primary winding and the junction of these networks. This arrangement forms a simple bridge circuit in which the coils $P_1$ and $P_2$ form two of the arms.

It will be evident that the condenser $C_2$ and the resistance $R_2$ may be adjusted so that the currents in the two primary coils are equal both in magnitude and phase. Under these conditions the fluxes set up by the currents in the two primary coils are equal and opposite and hence no voltage is induced in the secondary winding. As the values of $C_2$ and $R_2$ are changed more and more from these balanced values, larger and larger voltages are induced in the secondary coils, due to the difference in flux in the two halves of the primary winding.

A source of D. C. potential 10 shunted by a potentiometer 12 is connected in the grid circuits of the tubes $T_1$, $T_2$ between the cathodes or filaments and a central tap in the secondary winding of the transformer TR. By means of this potentiometer a continuously variable negative potential may be applied to the grids of the tubes. A D. C. voltmeter is connected across the potentiometer in such a manner as to indicate the negative voltage applied to the two grids. The voltmeter is not necessary if the potentiometer is properly calibrated.

The procedure for balancing by means of an arrangement of circuits described above, is as follows:—The potentiometer is first adjusted until the tubes just cease to follow the currents induced from the A. C. source. This may be observed directly from the tubes or by means of a differential milliameter 14 connected in the plate circuits. Under these conditions the negative potential applied to the grids is just sufficient to overcome the A. C. unbalance voltage. The negative voltage applied to the grids is then reduced until the tubes again follow the voltages induced from the A. C. source. The balance is then refined by adjusting the condenser $C_2$ or the resistance $R_2$ or both until the tubes again cease to follow the A. C. voltages. The negative voltage applied to the grids is further reduced by adjusting the potentiometer and the balance is further refined by adjusting the condenser $C_2$ and the resistance $R_2$. This step by step process of adjusting the potentiometer and then refining the balance by adjusting the condenser and resistance is continued until the negative voltage applied to the grids by means of the potentiometer is just sufficient to keep the tubes from oscillating when the A. C. source is removed.

This tendency of the tubes in an inverter circuit to oscillate without external excitation occurs only at very low values of negative grid battery. Thus suppose we remove the source of A. C., then as we reduce the negative voltage applied to the grids to a very low value, a point is reached where the tubes will begin to oscillate. The exact position of this point depends upon the characteristics of the tubes and whether the filaments are heated by A. C. current as indicated, or whether D. C. current is used. This is the zero reference point with respect to the external circuit. When this point is reached in balancing, as outlined above, a substantially perfect balance has been obtained.

Now suppose in Figure 1a we substitute for the capacity $C_1$ and the resistance $R_1$, a telegraph line grounded through a suitable resistance at the distant end or a metallic telegraph loop closed at the distant end. The network consisting of the condenser $C_2$ and the resistor $R_2$ is now, in effect, an artificial line and may be used to balance the real line. The primary coil $P_1$ becomes in effect the main line coil and the primary coil $P_2$ becomes the artificial line coil of the receiving transformer terminal apparatus.

In actual practice, a more complicated network is required to accurately balance the real line and in superposed circuits the primary $P_1$ would be split into two equal sections, one in each line wire. Such an arrangement is shown in patent to Morgenstern et al 1,809,722 in which the split primary is shown at $6^a$ and $6^b$; also in Patent 1,832,722 showing the split primary coil in Figure 2 at 25 and 26. The alternator 8 in Fig. 1a here becomes in actual practice a generator with reversible field as in said Patent 1,809,722, or a polar relay with positive and negative battery on its contacts as in said Patent 1,832,722. I have shown a circuit of this type in Figure 2, which is a repeater for superposed circuits and embodies gaseous arc discharge tubes of the type previously described, one well known form of which is known as a thyratron tube. The procedure for balancing this circuit is the same as above described.

This method of balancing is just as rapid, convenient and more accurate than any now available. For installations where tubes of the type referred to, such as thyratrons, are used as the receiver, it is by far the cheapest method, since the only additional apparatus necessary is the potentiometer, a voltmeter being unnecessary if the potentiometer is calibrated.

For balancing other duplex circuits, either grounded or metallic, where relays are employed as the receiver, a portable unit may conveniently be employed comprising the tubes and associated apparatus. The outer terminals of the transformer primary may be connected through suitable resistance units $r_1$, $r_2$ to a double conductor cord terminating in a plug 15, as indicated in Figure 1b. This plug may then be inserted in the bridge jack of any grounded duplex terminal or repeater.

If it is desired to know the actual peak volts across the relay, a coupling circuit such as shown in Figure 1c should be used. In this case the various filament, grid and plate battery sources must be metallic, i. e. without grounds. The transformer coupled circuit shown in Figure 1b should prove sufficiently accurate, however, since in the majority of cases we are interested only in comparative values.

Testing telegraph circuits

This invention provides, in addition to an efficient system of balancing as described above, a means of making various tests without any laborious calculations or additional apparatus.

Consider first the case of a duplex circuit employing gaseous arc discharge tubes of the type described, such as thyratrons, as the receiver. Here all measurements made by means of this arrangement are in peak volts across one half of the transformer secondary or peak volts applied to the tube. I have shown such a circuit in Figure 2.

If we wish to check our transmission to the West lines, we first ask the operator at the distant end to shut off his generator and we do likewise. We then open the line and adjust the potentiometer or balancing rheostat 12 until the tubes $T_1$, $T_2$ just fail to oscillate. Since there are now no external sources of disturbance, this is the so-called "zero" reference point. This reading on the rheostat dial must be subtracted from all subsequent measurements.

If we now close the line, the tubes will again operate in response to the induction present on the line. The potentiometer 12 is readjusted until the tubes just cease to operate, which gives the "induction level". From this reading we subtract the "zero" reading to obtain the peak value of the induction applied to the tubes in volts.

To determine the amount of unbalance in the artificial line, the generator G is started and A. C. impulses are sent over the West lines. The potentiometer 12 is then adjusted again until the tubes just fail to respond. From this reading we subtract the "induction level" reading to obtain the unbalance in peak volts. This may be corrected by adjusting the artificial line constants as previously explained. A perfect balance will now be obtained at the "induction level" instead of at "zero" as would be the case with no induction present.

To determine the peak value of the signals that are received, it is only necessary to have the operator at the distant end send A. C. impulses with our generator G stopped. The potentiometer 12 is then adjusted until the tubes just cease to follow the received impulses and from this reading must be subtracted the "induction level" reading.

By having the operator at the distant end send "correction" i. e. a single pulse, and again taking a reading as above indicated, we obtain the peak value of the single pulse. The difference between these two readings (A. C. peak value minus single-pulse peak value) is a measure of the characteristic distortion of this circuit. This difference divided by the A. C. peak value is the actual percent distortion. Likewise the percent duplex unbalance and percent induction may be obtained by simply dividing the values obtained for these measurements by the A. C. peak value.

Other tests may be made in a similar manner. The effect of any changes in the line or terminal apparatus may be observed directly in terms of the volts applied to the grids of the tubes.

It will be evident that the same method of testing may be applied to any telegraph circuit, one-way or duplex, by merely connecting the apparatus across the receiving relay by either of the methods shown in Fig. 1b or Fig. 1c. If the method of Fig. 1b is used, the votlmeter or potentiometer must be calibrated for the particular frequency to be used, and all tests must be made at that frequency. Also since the induction is of a different frequency than the measuring frequency, a correction factor must be applied to all readings in which the factor or induction is involved. This is relatively simple. If the circuit of Fig. 1c is used, no correction factor or calibration is necessary.

I claim:

1. The method of determining the amount of duplex unbalance existing on a duplex telegraph circuit which consists in associating the main line and artificial line elements of the duplex receiver in conjugate relation with an arc discharge tube inverter circuit, obtaining the minimum biasing grid voltage with the line closed and no signals being sent from either terminal, and then with signals being transmitted from the terminal at which measurements are being made, and subtracting the former voltage reading from the latter reading.

2. The method of determining the amount of induction present on any telegraph line which consists in associating in shunt relation to the coils of the receiving instrument an arc discharge tube inverter circuit, determining the minimum biasing voltage with the line open and then with the line closed with no signals being sent over the line, and subtracting the former reading from the latter to obtain the peak value of the voltage applied to the tubes due to said induction present on the line.

3. The method of determining the amount of induction present on any duplex telegraph line which consists in first obtaining the minimum biasing voltage according to claim 1 with the main line open, and then with the line closed, and with no signals being sent from either terminal and subtracting the former reading from the latter to obtain the peak value of the voltage applied to the tubes due to said induction present on the line.

4. The method of determining the peak value of the voltage of signals received over the line of any telegraph system which consists in adjusting the biasing grid voltage applied to the tubes until the tubes just cease to follow the received signal impulses according to claim 1 and from voltage reading thus obtained subtract the induction level reading.

5. The method of determining the peak value of the voltage of signals received over the line of any telegraph system which consists in associating in shunt relation to the coils of the receiving instrument an arc discharge tube inverter circuit, adjusting the biasing grid voltage applied to the tubes until the tubes just cease to follow the received signal impulses and from the voltage reading thus obtained subtract the induction level reading.

6. The method of balancing the main and artificial lines of a duplex telegraph system which consists in associating the main line and artificial line elements of the duplex receiver in conjugate relation with an arc discharge tube inverter circuit, alternately adjusting the constants of the artificial line and decreasing the biasing voltage on the grids of the tubes while transmitting to the line balancing signals until the tubes just cease to oscillate at the minimum biasing voltage.

JOHN H. HACKENBERG.